Feb. 28, 1967  F. L. HAAKE  3,306,633
QUICK DISCONNECT COUPLING
Filed March 30, 1965  3 Sheets-Sheet 1

INVENTOR.
FREDERICK L. HAAKE
BY C.E. Vautrain Jr. AGENT
G. Baxter Warner
ATTORNEY

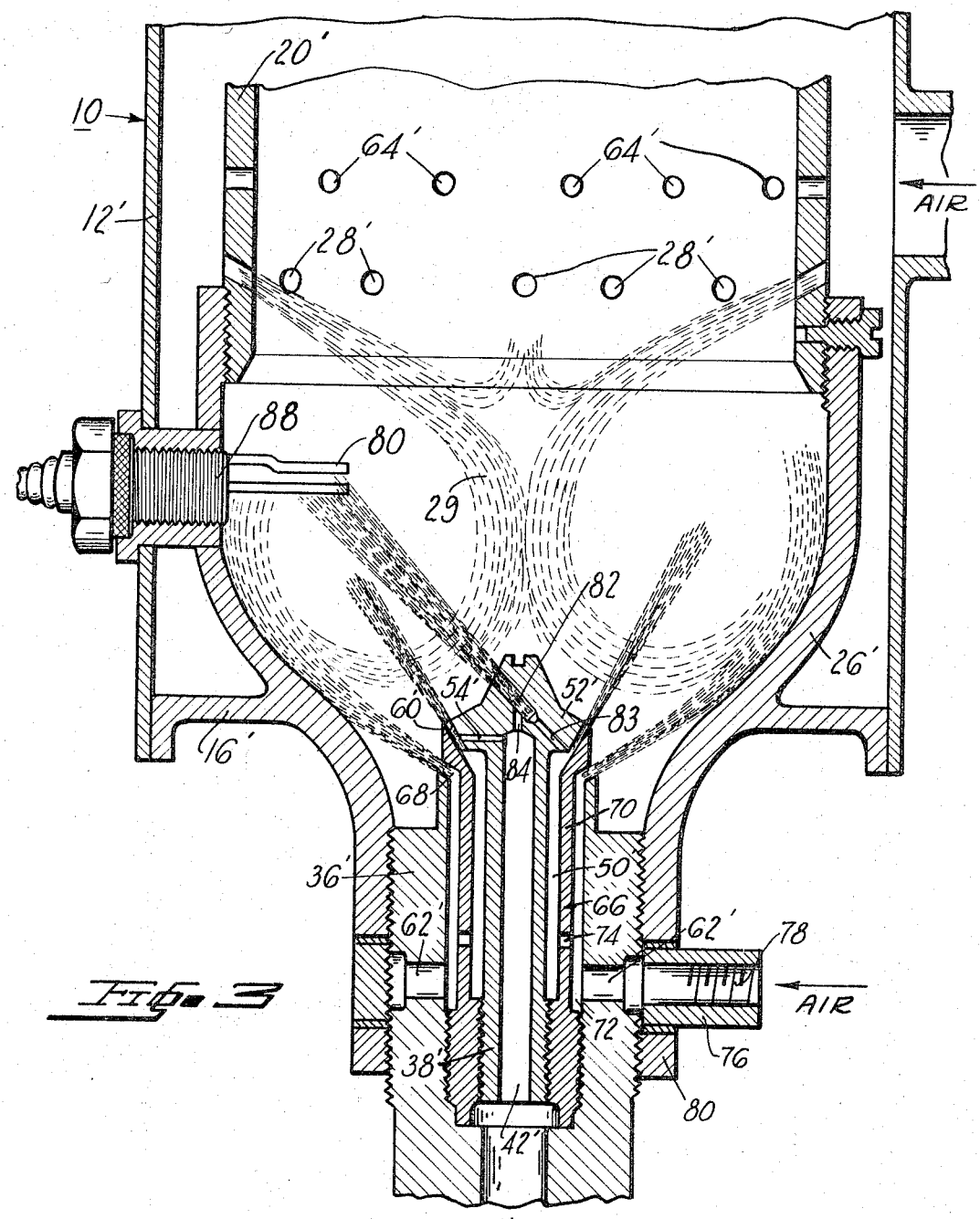

United States Patent Office 3,306,633
Patented Feb. 28, 1967

3,306,633
QUICK DISCONNECT COUPLING
Frederick L. Haake, 1519 Little Farms Road,
Oxnard, Calif. 93030
Filed Mar. 30, 1965, Ser. No. 444,088
10 Claims. (Cl. 285—2)

The invention disclosed herein may be manufactured and used by or for the Government of the United States of America for governmental purposes without the payment of any royalties thereon or therefor.

The present invention relates to couplings and more particularly to quickly releasable coupling devices for selectively securing and releasing adjoining sections of objects such as a missile to a launcher or multistage missile sections to each other.

The use of quick disconnect devices in space endeavors is increasing with the increased use of multisection rockets and missiles, and the need for reliable and sturdy yet unsophisticated release devices grows with the growth of our space endeavor. In sophisticated as well as rudimentary space vehicles and launchers, quick disconnect devices must be actuable in a positive manner within a required period of time which, in some instances, is in the order of microseconds. Prior release devices generally require a minimum of two elements, namely, a retention means by which adjacent sections are held together and a separate actuating means responsive to a condition so as to actuate the retention means and permit separation of the sections. The actuating means may be pyrotechnic in nature such as explosive squibs which sever bolts or otherwise release parts binding the sections together or fusible components responsive to temperature, or timing devices or similar means for actuating the release devices.

These conventional disconnect devices therefore require sequential steps of determining the existence of a condition under which disconnect is desired and communicating such information to the actuating mechanism. Such action renders these devices more complex than is necessary and also more susceptible to malfunction since either of the components may fail. It is desirable, therefore, in many applications such as missile stage separation to provide a more simplified actuating device which is directly actuated and has but one step in its operation, yet which may respond to more than one condition for actuation. The present invention provides such a simplified quick disconnect device.

Accordingly, it is an object of the present invention to provide a quick disconnect coupling which is simple in construction and independently actuable upon the occurrence of a predetermined condition.

It is another object of the present invention to provide a simplified disconnect coupling which may be actuated by a variety of conditions.

It is a further object of the present invention to provide a quick disconnect coupling which is internally disposed with respect to the connected sections and is therefore protected from weather and damage in handling and does not affect the aerodynamic characteristics of a vehicle in which it may be employed.

It is a still further object of the present invention to provide a quick disconnect coupling which is simple in construction and operation and may be actuated directly by exhaust gases.

Other objects and many of the attendant advantages of this invention will be readily appreciated as the same becomes better understood by reference to the following detailed description when considered in connection with the accompanying drawings in which like numerals designate like parts throughout and wherein:

FIG. 4 is a side elevational view of the quick disconnect device in use between stages of a missile;

FIG. 5 is a side elevational view of an alternate means for actuating the present quick disconnect device.

The quick disconnect device of the present invention is depicted both in the environment of a water-launch concept and in the environment of a missile interstage concept. In either application, the device may effect release of the components held together upon the occurrence of a force sufficient to displace the device a selected distance so as to release the adjacent portions of the sections to be separated. This force may result directly from the discharge of exhaust gases, may be an inertia force resulting from $g$ loading or may be in response to the ignition of a squib or displacement of a piston or from other applicable sources.

Figure 1:
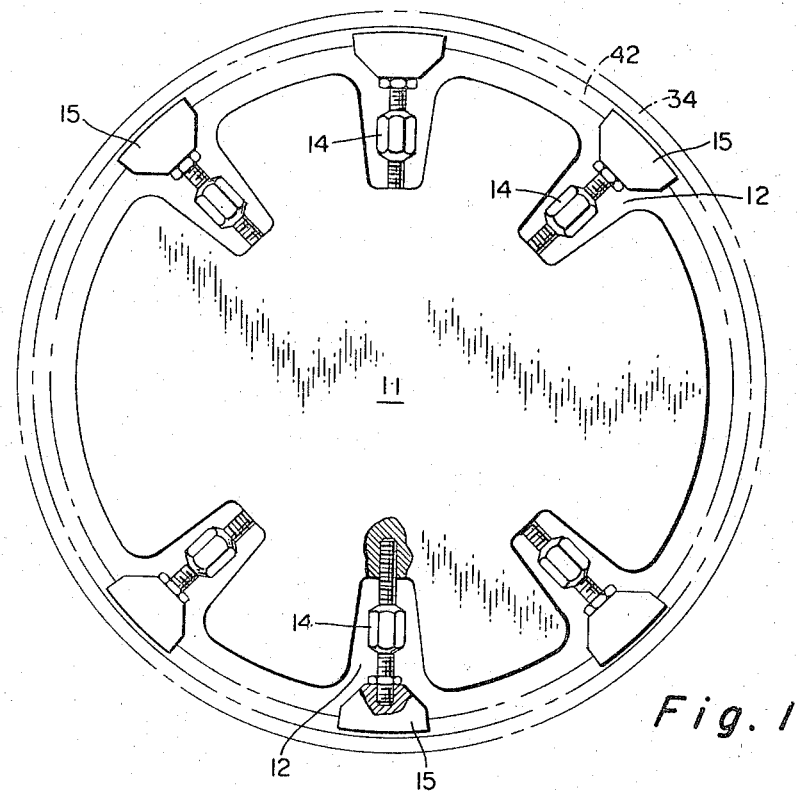
FIG. 1 is a plan view of one embodiment of the quick disconnect device assembly.
Figure 2:
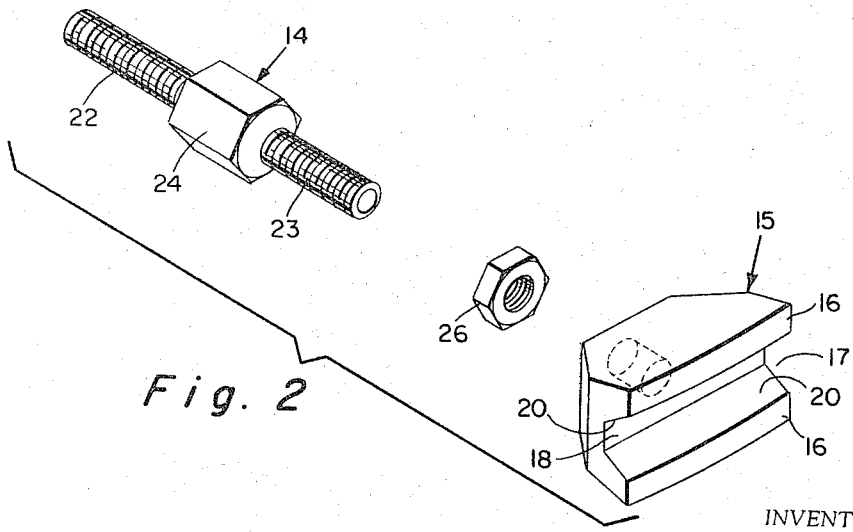
FIG. 2 is an exploded view of some of the components shown in FIG. 1.

Referring now to the embodiment of the invention illustrated in FIGS. 1 and 2, components of the device are shown to include a centrally disposed structural member in the form of thrust plate 11 which is to be supported between the sections to be releasably held together. Plate 11 may be notched as indicated at 12, the notches permitting elongate connectors 14 to be attached to plate 11 and interposed between the plate and quick disconnect wedge clamps such as shoes 15 which may be mounted thereon for engaging and exerting a binding force on the interfitting parts to be held together. Shoes 15 may be provided with jaws 16 which define a groove 17 in the shoes and may have various forms in cross section. It has been found preferable for certain applications, however, to provide a groove in which the base 18 is substantial in width with respect to the outer opening of the jaws and the sides 20 are inclined at an oblique angle to the base. Connectors 14 may have threaded extensions of the same hand and different pitch or may have oppositely threaded shafts 22 and 23 extending from either side of a flattened intermediate portion 24 which flattened portion provides surfaces over which a wrench or other tool may be placed to turn the shafts against pressure exerted through the connector to the area of the parts of sections being bound together. Plate 11 may be tapped for threads of one hand and shoes 15 then would be tapped for threads of the opposite hand, or plate 11 may be tapped and shoes 15 drilled but not tapped to receive an unthreaded shaft of connector 14. Connectors 14 are assembled to central plate 11 by turning shaft 22 into the tapped hole and shoes 15 then may be attached to or inserted over the remaining shaft 23. To provide for locking the connectors in place, nut 26 may be inserted over either threaded portion, the figures showing such a nut inserted over the outer shaft 23 of connector 14 before the shoes are turned onto this shaft.

Having shafts 22 and 23 of opposite hand threads permits adjustment of the shoe against the sections to be held and permits desired positioning of plate 11 between these sections. That is, the connectors on one side may be backed out of the central plate so as to displace the shoes a greater distance outward from the center portion of central plate 11 whereas on the opposite side of the connectors may be turned into the central plate to reduce the distance from the shoe to the center portion of the plate.

A central plate such as that shown in FIG. 1 may be installed between interfitting flanges or ridges of sections of a missile to be joined and centered therein by manipulation of the connectors, in the present embodiment numbering six, which are disposed about the periphery of central plate 11. When the central plate has been positioned as desired and the shoes have been tightened against the sections and the flanges have been brought in register, the lock nuts then may be tightened against the back of each of these shoes to secure them from movement during missile ignition and launch. It is desirable that the inner disposed shaft 22 be inserted an appreciable distance within central plate 11 so as to provide a firm connection with the plate, one which will not be prematurely loosened by missiles strains and vibrations.

Figure 3:
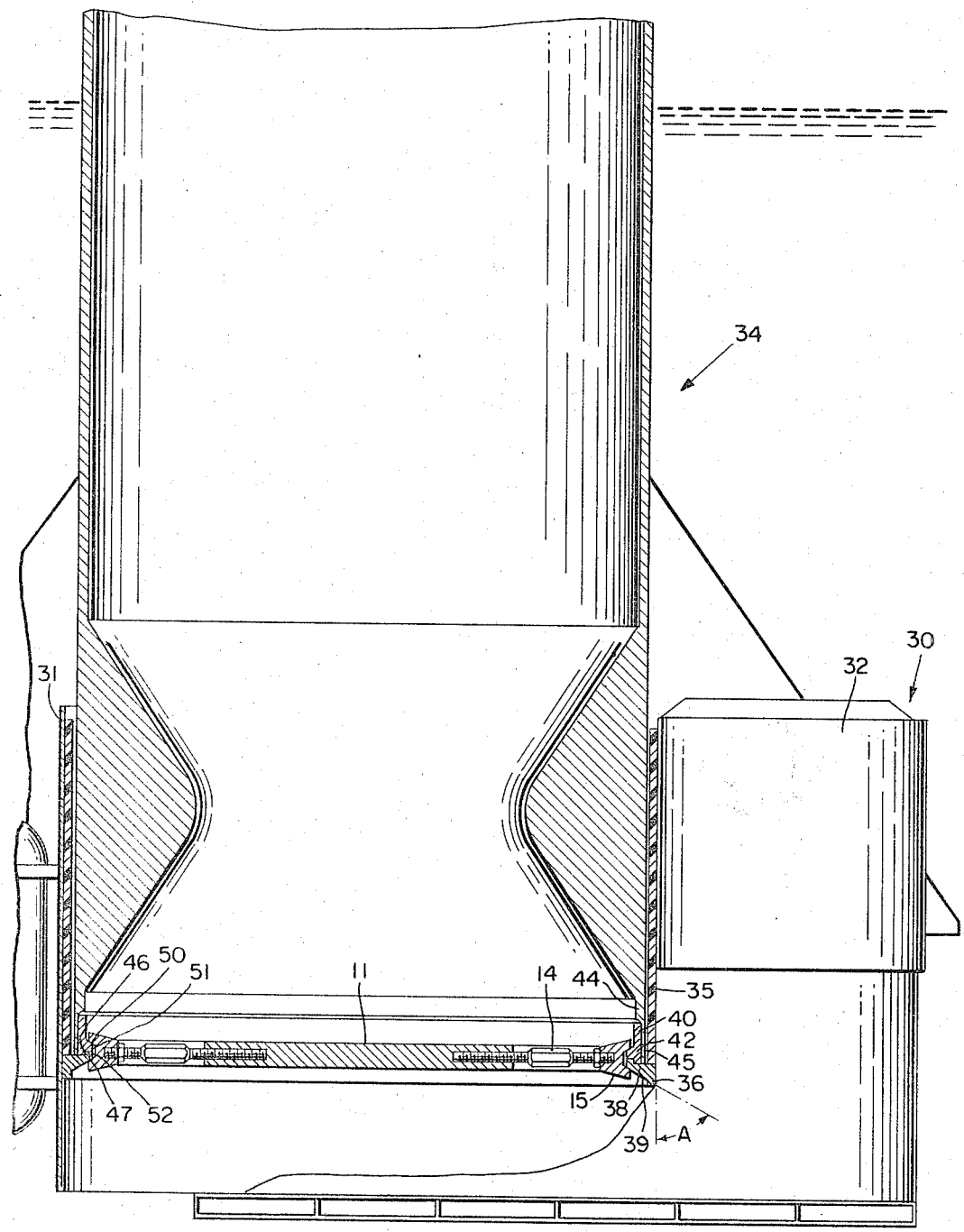
FIG. 3 is a side elevational view partly in section of the quick disconnect device of FIG. 1 installed in a launcher.

In FIG. 3, the retention-release device is shown assembled for use in floating missile launcher 30, the launcher shown merely being illustrative of the general manner of positioning the device so as to releasably secure together a launcher and a missile. Launcher 30 essentially may consist of a launching tube 31 which may be made buoyant by attachment thereto of tanks 32 or other types of flotation gear. Tube 31 should be sufficient in length so that a missile 34 may be supported within the tube a distance adequate to steady the missile during pre-launch stages. If desired, the diameter of tube 31 may exceed the outer diameter of the missile by an amount sufficient to permit the insertion of spacers 35 which may be of Teflon or similar material and which serve to reduce frictional binding during launch.

Missile 34 may be supported vertically in tube 31 by an encircling band such as collar 36 which may be secured to the tube by conventional means such as welding or brazing. Collar 36 serves as part of the release assembly in the present embodiment and may be provided with an inwardly extending ridge 38 having a taper angle A that corresponds to the taper angle of at least one of the sides 20 of groove 17 in shoe 15. The angled surface 39 of ridge 38 continues a sufficient distance to accommodate the side 20 of groove 17 when the present retention-release device is actuated. The missile or an insert therein should be provided with a ridge which may be mated with ridge 38, and in the illustrated embodiment sleeve 40 is provided with ridge 42 which forms together with ridge 38 a flange which closely conforms to groove 17 of shoe 15. The shell 44 of missile 34 is recessed at 45 to receive in sliding fit sleeve 40. It should be appreciated that ridge 42 and its contour features could be formed in the shell 44 of missile 34 or that the sleeve could be replaced by other components having a similar function within the concept of the invention.

In order to accurately position missile 34 and sleeve 40 within tube 31, collar 36 is formed with a raised step 46 and sleeve 40 is provided with a matching recess 47. Step 46 and recess 47 provide not only accurate positioning but under radial pressure exerted through shoes 15 assist in releasably holding the missile and launcher together so as to restrict lateral movement of one with respect to the other which shoes 15 otherwise would be required to do. The tapered surfaces 39 and 50 of collar 36 and sleeve 40, respectively, fit against mating surfaces of groove 17 while the inwardly disposed end surfaces 51 and 52 are substantially equal. When shoes 15 are forced outward against ridges 38 and 42, the end surfaces 51 and 52 of ridges 42 and 38 in the present embodiment have a slightly wider span than the base 17 of groove 15 so as to preclude contact therebetween. The sides 20 of groove 17 preferably are slightly shorter than surface 50 so as to preclude the outer end of jaws 16 from abutting against sleeve 40 while they are substantially shorter than surface 39 for a purpose to be explained under the description of operation.

In FIG. 4, the present embodiment of the invention is shown releasably connecting two successive stages of a multistage rocket or missile, and with plate 11 having a circular periphery 53. The shell 55 of a forward stage 56 may abut directly against the shell 57 of an after stage 58. The respective forward and after shells may be provided with ridges 38 and 42 formed integrally therewith and the two stages may be interconnected in the same manner as are launcher 31 and missile 34 shown in FIG. 3. Aft stage 58 is provided with ports 60 to permit escape of the exhaust gases of the preceding stage thereby avoiding creating a shock which otherwise would be transmitted to aft stage 58. Nozzle 61 of the forward stage is shown in a preferred position with respect ot its spacing from central plate 11.

FIG. 5 illustrates one form of inertia device which may be used to displace central plate 11 and thus release one section or stage from another. In this instance, displacement of central plate 11 is effected through movement of a weight 64 in response to acceleration of the structure in which the components are assembled. A post 65 may be attached to the major surface of plate 11 against which weight 64 is to contact, and weight 64 then may be secured on the post by separable means such as shear pin 66. In the disposition shown of weight 64 and plate 11, either acceleration in a direction from right to left or deceleration in the reverse direction will cause the weight to move toward the plate provided the acceleration or deceleration forces are sufficient to sever shear pin 66. The preselected force of impact of weight 64 against plate 11 should be sufficient to cause shoes 15 to release the components held together in a manner to be described infra.

Operation of the retention-release device in each of the embodiments illustrated is similar and generally involves a clamping or binding action in which two flanges or ridges are forced against each other by wedging and are released when the wedging force is removed by removal of the shoes. As has already been indicated, the shoes 15 both hold and release the adjoining portions of the sections to be releasably retained. To accomplish such action, the shoes, in the embodiments illustrated, are provided with a groove the sides of which diverge from the groove's relatively wide base. The angle of divergence may be varied within wide limits, however, that angle selected for a particular application of the invention is necessarily a compromise between the wedging force desired to hold together the adjoining sections and the force required to disengage the shoes from the adjoining sections.

In holding together the adjoining sections, a radially outward force is exerted against the shoes 15 by the connectors 14 which force is transmitted by the diverging sides 20 of the shoes to the appropriate surfaces of the sections to be held together. Lateral movement of one section with respect to the other is restricted by step 46 so that shoe 15 may be relatively small since it is not required to inhibit both lateral and longitudinal movement of the sections. Although the sides 20 are shown in the various figures to diverge at equal angles from base 18 of groove 17, it will be appreciated that the angles of divergence may be dissimilar within the inventive concept, that is, that in some applications it may be preferable to have the side 20 adjacent the forward missile section diverge at a lesser or greater angle than shown and the side 20 adjacent the aft missile section diverge at a greater or lesser angle or in various combinations within the scope of the invention.

Central plate 11 may be spaced as desired laterally between sections by movement in or out of respective connectors 14. After positioning, the connectors are further turned to the desired pressure and locked in place by lock nuts 26. The sections now will be held securely together until the occurrence of a predetermined force against one of the major surfaces of central plate 11. It will be appreciated that any of a number of means may be employed to apply this force to central plate 11. The application of such force if properly effected would be to displace the central plate in the direction of force application since the bolt portions 22 and 23, which preferably are made of metal as are the shoes 15 and connectors 24, should be deformed by the force due to their being formed and constructed to bend under a selected amount of pressure. As connectors 24 are bent presumably in the threaded shafts, it may be seen by referring to FIGS. 3 and 4 that the shoes 15 will slide over the adjoining sections, e.g. ridges 38 and 42, until the side 20 in the direction from which force is applied clears the inner edge of the abutting sections. It is contemplated that the force applied against central plate 11 will be distributed either substantially uniformly across the plate or be substantially symmetrically applied against it so that each of the shoes will be displaced substantially identically resulting in central plate 11 being moved generally parallel to its initial position. By having the longer surface 39 on the section into which the jaws 16 will be displaced, space is provided into which the leading jaws may move thereby permitting each shoe freedom of movement and avoiding a need for excess force to dislodge the retention-release device.

It is thus submitted that the present invention provides a simple but effective retention-release device which may be actuated by a variety of force applications. Where the device is disposed between missile sections, a selected force of the exhaust gases of the stage immediately forward of the device can dislodge the device and free this stage from the remainder of the missile. The device also may be dislodged by the force emanating from a squib which may be actuated by the igniter of the forward section or by other actuating means, or the device may be dislodged by predetermined acceleration or deceleration forces. Plate 11 may have various forms such as circular, hexagonal or other configuration, with or without notches, within the scope of the invention. Use of the device is not limited to missiles, of course, it being applicable to other fields of art such as, for example, flotation devices, underwater containers, capsules, piping, tubing, tankage and generally where two or more sections are to be releasably joined together. In certain applications such as piping and tubing plate 11 would be replaced by open framework to permit passage of fluids.

It will be recognized that many modifications and variations of the present invention are possible in the light of the above teachings such as, for example, in the shape of the shoe and the flanges which it holds together. It is therefore to be understood that within the scope of the appended claims the invention may be practiced otherwise than as specifically described.

I claim:

1. A coupling device for releasably securing together two adjoining sections of an object, the sections having interfitting interior ridges or flanges which register with each other comprising:
   a structural member centrally disposed with respect to the flanges to be releasably secured;
   a plurality of movable wedging members spaced about the interfitting flanges and adapted to exert a binding force thereupon; and
   a plurality of connectors interposed between the central structural member and the wedging members for maintaining an outward force against said wedging members;
   whereby displacement of said central structural member a selected amount will dislodge said wedging members and permit separation of said sections.

2. The device as defined in claim 1 wherein said central structural member is a plate which extends substantially across the area enclosed by said flanges;
   said plate indented at a plurality of points on its periphery to receive said connectors.

3. The device as defined in claim 1 wherein said connectors are adjustable to vary the spacing between said central structural member and said flanges.

4. The device as defined in claim 1 wherein said central structural member is adapted to be moved laterally with respect to said sections so as to permit lateral positioning of the structural member; and
   locking means associated with said connectors for locking said central structural member in a desired position with respect to said flanges.

5. The device as defined in claim 2 wherein said wedging members are provided with jaws which partially enclose portions of said interfitting flanges;
   said jaws defining a recess which receives in close fit said portions of said flanges;
   the surface of said flanges in the direction in which displacement of said structural member is to occur being continued outward to permit movement therealong of the respective jaw of said wedging member during displacement of said structural member.

6. A quick disconnect coupling device for releasably securing together two adjoining sections of an object comprising:
   a thrust plate having a surface area sufficient in scope to extend across a substantial portion of the cross section where said sections adjoin;
   a plurality of elongate connectors disposed about the periphery of said thrust plate for spacing and supporting said plate between said sections where they adjoin;
   said thrust plate notched about its periphery and adapted to receive one end of a respective one of said connectors in each of said notches;
   said sections having inwardly extending interfitting flanges at their areas of adjointment;
   a plurality of wedge members having jaws adapted to fit in close relationship over said interfitting flanges;
   said wedge members adapted to be mounted over the ends of said connectors remote from said thrust plate;
   said connectors adjustably attached to said thrust plate to permit lateral displacement of the thrust plate and tightening of said wedge members against said flanges so as to produce a desired binding of the flanges; and
   locking means on said connectors for securing the connectors with respect to the flanges so as to reduce to a minimum loosening occasioned by strain and vibration of said sections;
   whereby said thrust plate may be securely positioned between said sections by adjustment of said connectors and said wedge members may be quickly dislodged from said flanges by displacement of said thrust plate in response to a selected thrust in one of said sections.

7. The device as defined in claim 6 wherein the exterior surfaces of said interfitting flanges taper toward said thrust plate and the jaws of said wedge members have inner surfaces which abut the tapered flange surfaces;
   said flanges and said jaws formed so that their longitudinally end surfaces are spaced apart thereby directing all of the binding force of said wedge members against the tapered flange surfaces.

8. The device as defined in claim 7 wherein the tapered surface of said flanges which is disposed in the direction in which displacement of said structural member is to occur is continued outward to permit movement therealong of the respective jaw of said wedging member during displacement of said structural member.

9. The device as defined in claim 8 wherein the ends of said connectors are shafts having threads of opposite hand and said thrust plate and said wedge members are adapted to receive the respective threaded shafts so that turning of said connectors will cause opposite and cumulative lateral movement of the thrust plate and wedge members.

10. The device as defined in claim 8 wherein the ends of said connectors are shafts having threads of the same hand but different pitch and said thrust plate and said wedge members are adapted to receive the respective threaded shafts so that turning of said connectors will cause cumulative lateral movement of the thrust plate and wedge members.

References Cited by the Examiner

UNITED STATES PATENTS

| | | | |
|---|---|---|---|
| 2,809,584 | 10/1957 | Smith. | |
| 2,836,117 | 5/1958 | Lankford | 102—2 |
| 2,945,704 | 7/1960 | Koln | 285—18 |
| 3,140,886 | 7/1964 | Cortilla et al. | 287—119 |

OTHER REFERENCES

Gengle, R. L. et al.: An Experimental Technique for the Investigation of Tipoff Forces Associated With Stage Separation of Multistage Rocket Vehicles, in National Aeronautics and Space Administration Technical Note, pp. 12, 13, 25, D. 1030, March 1962, 102–495.

CARL W. TOMLIN, *Primary Examiner.*

D. W. AROLA, *Assistant Examiner.*